US008588060B2

United States Patent
Holness

(10) Patent No.: US 8,588,060 B2
(45) Date of Patent: Nov. 19, 2013

(54) E-SPRING (G.8032) INTERWORKING TO PROVIDE ACCESS PROTECTION

(75) Inventor: Marc Holness, Nepean (CA)

(73) Assignee: Ciena Corporation, Hanover, MD (US)

( * ) Notice: Subject to any disclaimer, the term of this patent is extended or adjusted under 35 U.S.C. 154(b) by 354 days.

(21) Appl. No.: 12/892,959

(22) Filed: Sep. 29, 2010

(65) Prior Publication Data

US 2011/0075554 A1    Mar. 31, 2011

Related U.S. Application Data

(60) Provisional application No. 61/246,576, filed on Sep. 29, 2009.

(51) Int. Cl.
 *G06F 11/00* (2006.01)
(52) U.S. Cl.
 USPC .............................. 370/228; 370/217; 370/400
(58) Field of Classification Search
 USPC ......... 370/217–220, 225–228, 255–256, 258, 370/400, 410, 437, 449–450, 465, 242–245
 See application file for complete search history.

(56) References Cited

U.S. PATENT DOCUMENTS

| | | | | |
|---|---|---|---|---|
| 4,780,869 A * | 10/1988 | Engdahl et al. | ................ | 370/228 |
| 5,687,168 A * | 11/1997 | Iwata | ............... | 370/255 |
| 6,868,080 B1 * | 3/2005 | Umansky et al. | ............. | 370/354 |
| 7,561,571 B1 * | 7/2009 | Lovett et al. | ................... | 370/392 |
| 7,668,081 B2 * | 2/2010 | Hermsmeyer et al. | ......... | 370/218 |
| 7,768,928 B2 * | 8/2010 | Harel et al. | ................. | 370/241.1 |
| 8,218,538 B1 * | 7/2012 | Chidambaram et al. | ....... | 370/386 |
| 8,472,439 B2 * | 6/2013 | Cohen et al. | ................... | 370/389 |
| 2007/0189154 A1 * | 8/2007 | Hourtane et al. | ............. | 370/218 |
| 2008/0112312 A1 * | 5/2008 | Hermsmeyer et al. | ......... | 370/228 |
| 2009/0067324 A1 * | 3/2009 | Licardie et al. | ............... | 370/225 |
| 2010/0284413 A1 | 11/2010 | Abdullah et al. | | |
| 2012/0134262 A1 * | 5/2012 | Licardie et al. | ............... | 370/225 |
| 2013/0064102 A1 * | 3/2013 | Chang et al. | ................... | 370/244 |

\* cited by examiner

*Primary Examiner* — Kevin Mew

(74) *Attorney, Agent, or Firm* — Kent Daniels; Daniels IP Services Ltd.

(57) ABSTRACT

A method of enabling a resilient interface between a first node and a G.8032 Ethernet ring. A Link Aggregation Group (LAG) comprising respective links is provided between the first node and at least two ring nodes of the Ethernet ring. An aggregation function is instantiated at the first node, for distributing subscriber traffic to the links of the LAG in a conventional manner. A first one of the ring nodes is designated as Active, and each of the other ones of the ring nodes are designated as Inactive. At each Inactive ring node, a logical block is imposed on its respective link of the LAG, such that subscriber traffic between the first node and the Ethernet ring is routed by the aggregation function only through the respective link between the first node and the Active ring node.

12 Claims, 3 Drawing Sheets

E-SPRING (G.8032) INTERWORKING TO PROVIDE ACCESS PROTECTION

CROSS-REFERENCE TO RELATED APPLICATIONS

This application is based on, and claims benefit of, provisional U.S. patent application Ser. No. 61/246,576 filed on Sep. 29, 2009, the entire contents of which are hereby incorporated in herein by reference.

MICROFICHE APPENDIX

Not Applicable.

TECHNICAL FIELD

The present invention relates to optical communications networks, and in particular to high speed digital signal processing in a coherent optical receiver.

BACKGROUND

ITU-T SG15/Q9 recommendation G.8032 (February 2008) describes protection switching in an Ethernet ring. Referring to FIG. 1, an Ethernet ring 2 is an Ethernet network comprising nodes 4 and links 6 connected together in a closed loop topology. One of the links 6 of the ring is designated as a Ring Protection Link (RPL), and is disabled during normal operation of the ring by placing a channel block on that link. Typically, a channel block 8 is imposed at a node at one end of the RPL, which node may then be referred to as the RPL Owner. In some cases, the channel block 8 may, for example, comprise a policy that prevents packets of the ring from being forwarded through a port hosting the RPL. With such a channel block in place, the ring 2 is guaranteed to be loop free, and conventional Ethernet MAC-learning and path computation can be used to compute and install appropriate forwarding information in each node of the ring.

As described in ITU-T recommendation G.8032, a failure of either a link 6 or a node 4 of the ring 2 will be detected by the two nodes 4 nearest the point of failure. Both of these nodes will send a Failure Indication Message (FIM) to their nearest neighbour nodes in the ring, and these FIMs will be propagated, in opposite directions, around the ring. Upon receipt of a FIM, each node flushes its forwarding database (FOB), and forwards the FIM to the next node on the ring. In addition, the RPL-Owner will remove the channel block 8. This effectively enables connectivity within the ring to be re-established using conventional Ethernet flooding and MAC learning functionality.

An advantage of ITU-T recommendation G.8032 is that it utilizes conventional Ethernet path labelling and packet forwarding techniques to implement a ring network. However, ITU-T recommendation G.8032 contemplates an arrangement in which the ring network is defined entirely within a given Ethernet network domain.

As may be seen in FIG. 1, customer located equipment (CLE) 10, such as a customer premised Local Area Network or router, for example, can connect to the Ethernet ring 2 via an access connection 12. In a directly analogous manner, the Ethernet ring 2 can connect to a network edge node such as a gateway (GW) 14 to a foreign network domain 16 through a hand-off connection 18. In the following description, various known methods of implementing the access connection 12 between the CLE 10 and the Ethernet ring 2 are discussed with reference to FIGS. 2a and 2b. It will be appreciated that these same techniques may be used to implement the hand-off connection 18 between the Ethernet ring 2 and the gateway 14, with the same advantages and disadvantages.

FIG. 2a shows a typical arrangement for connecting customer located equipment (CLE) 10 to an Ethernet ring 2 via an access connection 12. The CLE 10 may, for example, be a computer system, a router, or a local area network (LAN) at a client site. In the arrangement of FIG. 2, the access connection 12 is implemented as a conventional point-to-point Ethernet connection between the CLE 10 and a client-facing port (not shown) of a Network Interface (NI) 20 of an Access Node (AN) 4a. The NI 20 provides connectivity between the Ethernet access connection 12 and the Ethernet Ring 2 in a conventional manner. In some practical systems, the NI 20 may be implemented as a "Muxponder" (MOTR), which is an interface card designed to support both client interface multiplexing and network-side optical transceiver functions on a single device. In such cases, the NI 20 will have a unique MAC address in the Ethernet ring 2, and operates as a node of the ring 2. The arrangement of FIG. 1 a disadvantage in that it cannot provide resilient end-to-end connectivity because both the point-to-point access connection 12 and the NI 20 represent single points of failure.

FIG. 2b illustrates an alternative arrangement in which Split Multi Link Trunking (SMLT), which is described in Applicant's U.S. Pat. No. 7,269,132, is used to provide a dual homed connection to the access node 4a. In very general terms, the access connection 12 is configured as a Link Aggregation Group (LAG), which comprises a plurality of parallel links 22 (in FIG. 2b, the LAG comprises two parallel links, but there can be more than two parallel links). At the client end of the Ethernet connection 12 the links 22 are connected to the CLE 10 via an aggregator function 24, which serves to distribute packet traffic across the links 22 of the LAG using a Link Aggregation Control Protocol (LACP) known, for example, from IEEE 802.3ad. At the network-end of the Ethernet connection 12, each link 22 is connected to a respective node 4, via a corresponding instance of a distributed aggregator function 26 associated with the respective Nis 20. This arrangement provides a "dual homed" connection to the Ethernet ring 2, and facilitates load balancing (between the links 22 and nodes 4) and inherent resiliency. In order to prevent network instability and loops, complex algorithms must be implemented to coordinate the operations of the peer Nis 20a-b. Typically, this involves controlling the distributed aggregator function 26 and the involved peer Nis 20a-b to emulate a single aggregator/NI system which mirrors the CLE/aggregator system 10,24 at the other end of the LAG. In order to implement this emulation, the respective forwarding databases in each of the peer Nis 20a-b must be tightly synchronized. The signalling required to support this synchronization is typically routed through an inter-switch connection 28 set up between the involved Nis for that purpose. The arrangement of FIG. 2b is advantageous in that it removes the single points of failure at both the access connection 12 and the Nis 20a and 20b themselves. However, there still remains a single point of failure in the link 28 between the two Nis, and the complexity associated with the distributed aggregation function 26 is undesirable.

Techniques enabling resilient access and hand-off interface connections to G.8032 rings remain highly desirable.

SUMMARY

Aspects of the present invention provide techniques for implementing resilient interface connections between an edge node (e.g. CLE, or a network edge router node) and a G.8032 ring.

One aspect of the present invention provides a method of enabling a resilient interface between a first node and a G.8032 Ethernet ring. A Link Aggregation Group (LAG) comprising respective links is provided between the first node and at least two ring nodes of the Ethernet ring. An aggregation function is instantiated at the first node, for distributing subscriber traffic to the links of the LAG in a conventional manner. A first one of the ring nodes is designated as Active, and each of the other ones of the ring nodes are designated as Inactive. At each Inactive ring node, a logical block is imposed on its respective link of the LAG, such that subscriber traffic between the first node and the Ethernet ring is routed by the aggregation function only through the respective link between the first node and the Active ring node.

In one embodiment, the resilient interface is provided by extending 802.3ad to enable implementation of a Link Aggregation Group (LAG) between the first node and a pair of neighbour nodes on the G.8032 ring. Once established, the LAG provides resilience using methods known from 802.3ad, with LACP signalling between the two neighbour nodes being (resiliently) forwarded through the G.8032 ring. This embodiment is useful in cases where the first node does not support G.8032 traffic forwarding, and/or already is capable of supporting 802.3ad LAG.

In another embodiment, the resilient interface is provided by means of a G.8032 version 2 sub-ring defined to encompass the first node and a pair of neighbour nodes on the G.8032 ring. Once established, the sub-ring provides resilience using methods known from G.8032 version 2. This embodiment is useful in cases where the first node supports G.8032 traffic forwarding.

The above techniques can be implemented to provide resilience for both an access interface between customer located equipment (CLE) and a G.8032 ring, and a hand-off interface between a G.8032 ring and an edge node of the network.

BRIEF DESCRIPTION OF THE DRAWINGS

Representative embodiments of the invention will now be described by way of example only with reference to the accompanying drawings, in which.

DETAILED DESCRIPTION

Figure 3:
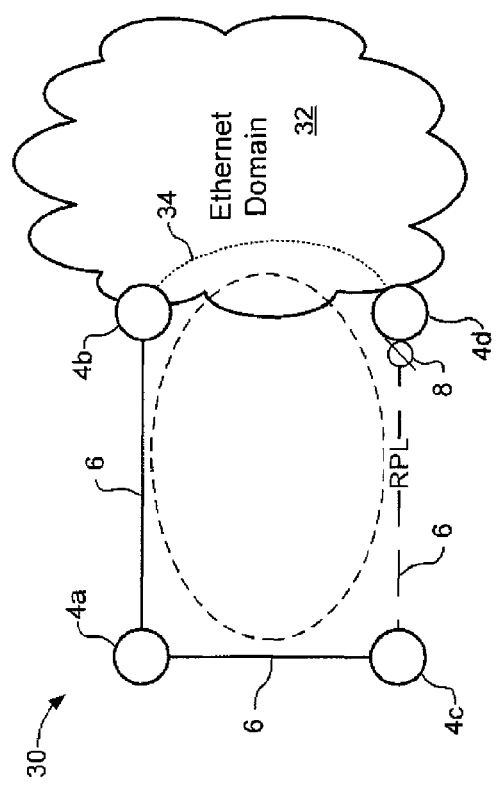
FIG. 3 is a block diagram schematically illustrating an Ethernet sub-ring usable in the present invention.

In general, the present invention extends the techniques described in ITU-T recommendation G.8032 to implement a resilient connection between a node (such as a OLE or an edge node such as a gateway) and an Ethernet ring Applicant's co-pending U.S. patent application Ser. No. 12/463,827 filed May 11, 2009 teaches dual-homed connection techniques, in which an Ethernet sub-ring 30 is used to provide a resilient connection to an Ethernet domain 32. Referring to FIG. 3, a sub-ring network 30 is an Ethernet network (or sub-network) which includes two or more neighbour nodes 4 interconnected by links 6 to form a linear path extending between two "end-nodes" (nodes 4b and 4d in FIG. 3). A virtual connection (or link) 34 may be set up through the Ethernet domain 32 between the two end-nodes 4b and 4d. As may be seen in FIG. 3, the virtual link 34 "closes" the sub-ring network 30 to provide a ring-topology.

In order to guarantee loop-freeness, one of the end-nodes (4d in FIG. 3) is designated as the RPL-Owner, and the link 6 connecting the RPL-Owner to its nearest neighbour on the sub-ring 30 (node 4c in FIG. 3) is designated as the RPL. A channel block 8 is imposed on the RPL in order to prevent packet forwarding through the RPL during normal operations of the sub-ring network 30. With this arrangement, traffic forwarding, channel blocking and protection schemes of the type known, for example, from ITU-T recommendation G.8032 described above can be implemented in the sub-ring network 30, with packet transport through the virtual link 34 to ensure continuity of the ring topology.

In some embodiments, sub-ring control messages, such as Failure Indication Messages can be transported through the virtual link 34. In other cases, sub-ring control messages can be terminated at the end-nodes, so that they are not forwarded through the virtual link 34. This later option is workable because the virtual link 34 emulates a direct physical link between the two end nodes, and it is only the end nodes that will act upon any sub-ring control messages sent through the virtual link 34. However, the traffic forwarding rules of G.8032 ensure that all of the nodes of the sub-ring, including the end nodes, will automatically receive all sub-ring control messaging through the sub-ring itself, and it is not necessary to forward any control messaging through the virtual link 34 in order to guarantee this outcome. Thus, proper traffic forwarding and protection switching functionality of the sub-ring network 30 can be obtained without sending sub-ring control messages through the virtual link 34. Accordingly, the sub-ring network 20 can be defined without the virtual link 34. In such cases, the two end-nodes (4b and 4d in FIG. 3) may be referred to as termination nodes, because sub-ring control messaging of the sub-ring 30 is terminated at these points. However, it should be noted that, in this case, the "termination" of the sub-ring control messaging does not imply termination of subscriber traffic, which can still be forwarded through the Ethernet domain 32.

The sub-ring network 30 of FIG. 3 is composed of four neighbour nodes 4a-d, but this is not essential. In fact, a sub-ring network 30 can be composed of as few as two neighbour nodes 4, both of which would, in such cases, be end-nodes.

Figure 4:
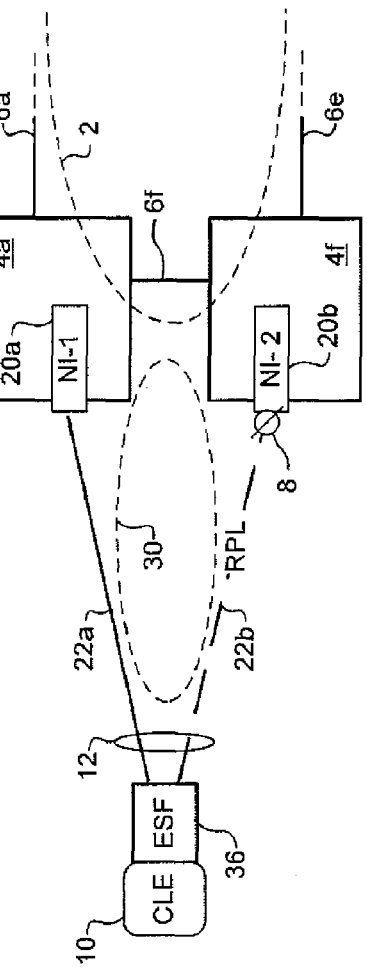
FIG. 4 is a block diagram schematically illustrating a resilient access connection between a node and an Ethernet ring using the sub-ring of FIG. 3, in accordance with an embodiment of the invention.

FIG. 4 illustrates an embodiment in which a three-node sub-ring 30 is used to provide a resilient dual-homed access connection 12 between the CLE 10 and the Ethernet ring 2

As may be seen in FIG. 4, the sub-ring 30 comprises a G.8032 compliant Ethernet Switching Function (ESF) 36 associated with the CLE 10, which is connected to two nodes 4a and 4f of the Ethernet ring 2 via respective links 22a, 22b. In the illustrated embodiment The ESF 36 may be implemented using an Ethernet switch connected to the CLE 10, or by means of suitable software executing on the CLE 10 itself, if desired. The nodes 4a and 4f are configured to operate as end-nodes of the sub-ring 30. The nodes 4a and 4f do not need to be neighbour nodes on the Ethernet ring 2. One of the nodes (4f in FIG. 4) is designated as the RPL-Owner, and imposes a channel block 8 on its link 22b to the ESF 36 so as to guarantee loop freeness of the sub-ring network 30.

In one practical implementation, each of the nodes 4a and 4f may be provided as a Layer 2 Multi-Service Optical Transceiver (MOTR) "Muxponders" manufactured and sold by Ciena Corporation for use in its Optical Multi-Service Edge (OME) 6500 series shelf. In such cases, the MOTRs 4a and 4f may be installed in the same OME6500 shelf, or in respective different shelves, as desired. An advantage of this equipment is that it provides high transport capacity, and can be readily configured to support the required G.8032 functionality of the sub-ring 30 by means of a suitable software upgrade. However, the present invention is by no means limited to such embodiments.

Because the nodes 4a and 4f, are configured to operate both as end-nodes of the sub-ring 30 and nodes of the Ethernet ring 2, in embodiments in which the definition of the sub-ring 30 includes the virtual connection 34, the Ethernet ring 2 can be used to carry sub-ring control messaging, as required.

Figure 1:
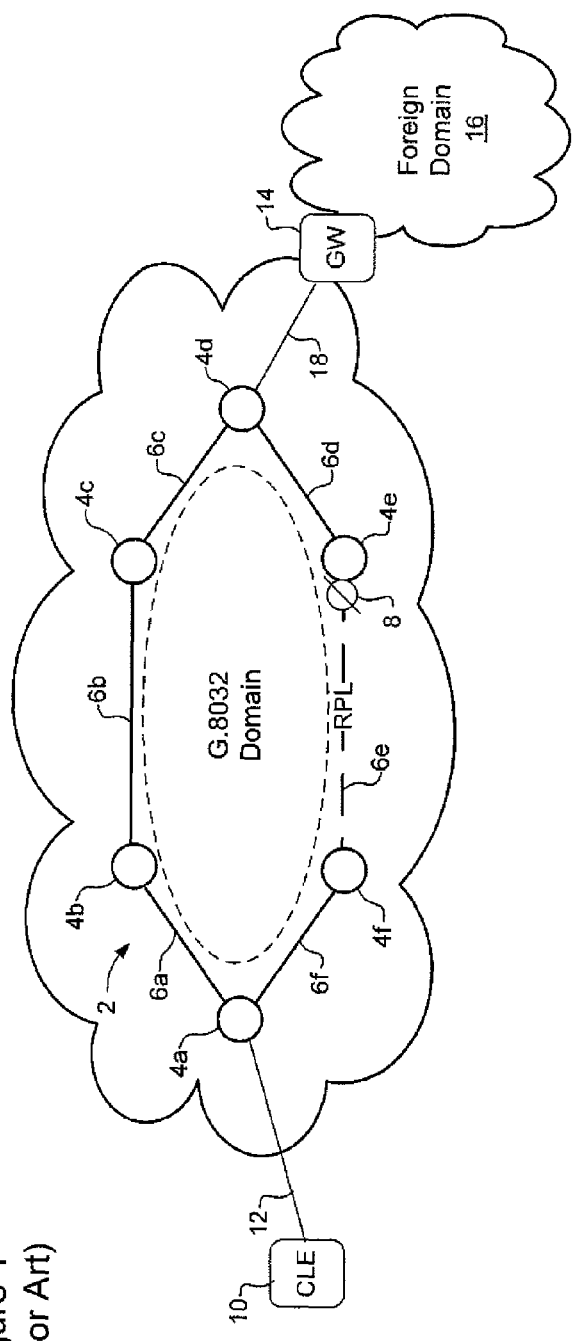
FIG. 1 is a block diagram schematically illustrating an Ethernet ring known from ITU-T recommendation G.8032.
Figure 2B:
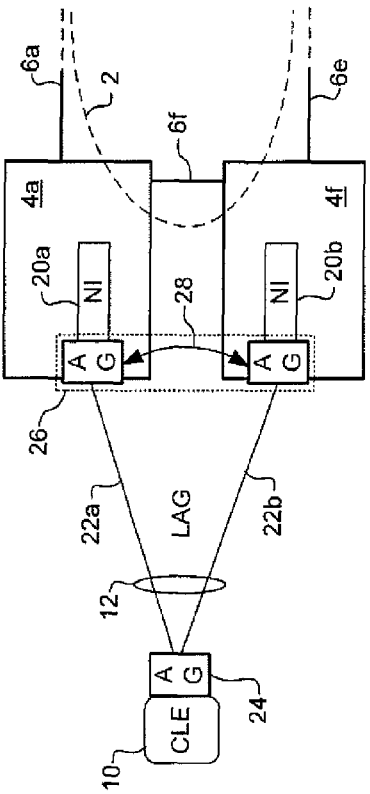
FIGS. 2a and 2b are block diagrams schematically illustrating respective conventional techniques for connecting a node to an Ethernet ring.
Figure 2A:
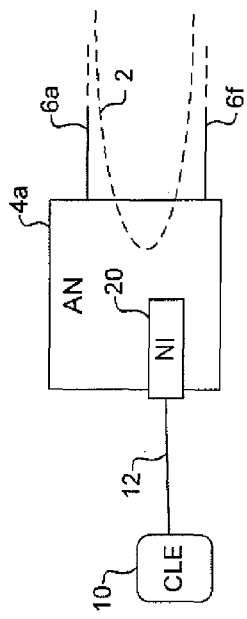
Figure 5:
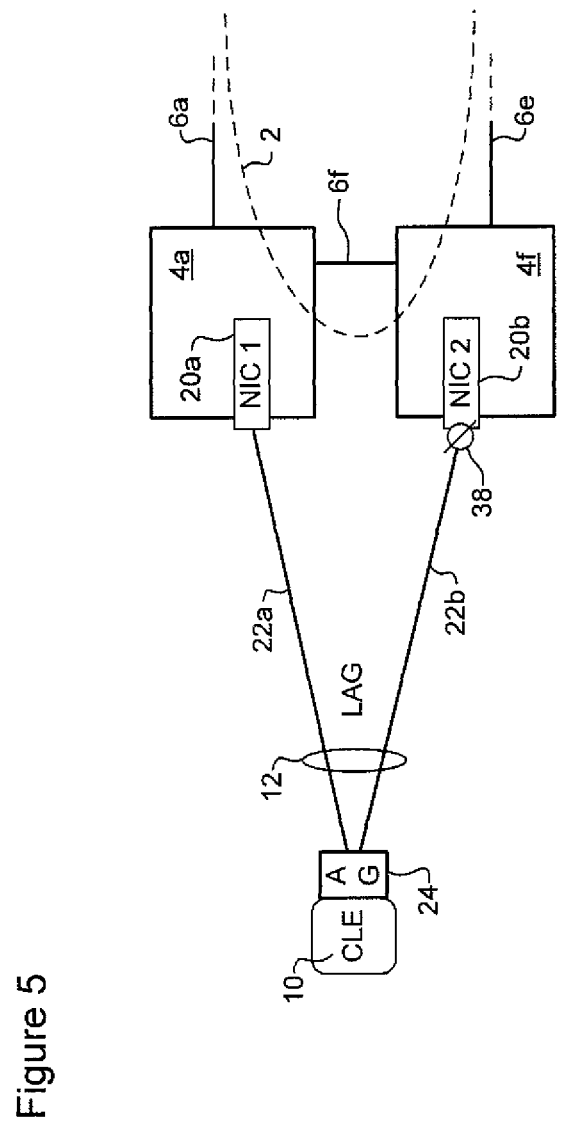
FIG. 5 is a block diagram schematically illustrating a resilient access connection between a node and an Ethernet ring a link aggregation group (LAG), in accordance with an embodiment of the present invention It will be noted that throughout the appended drawings, like features are identified by like reference numerals.

The embodiment of FIG. 4 is advantageous in that it removes all single points of failure in the access connection 12 between the CLE 10 and the Ethernet ring 2. Traffic forwarding, channel blocking and protection schemes of the type known, for example, from ITU-T recommendation G.8032 can be implemented in the sub-ring 30 to control packet flows between the Ethernet ring 2 and the CLE 10. Resilient end-to-end connectivity between the CLE 10 and addresses reachable through the Ethernet ring 2 can be established by means of known MAC learning and path computation techniques. Furthermore, the complex algorithms required to implement the distributed aggregation function 26 of FIG. 2b are not required. However, this technique suffers a disadvantage in that a G.8032 compliant Ethernet Switching function (ESF) 28 must be provided at the CLE 10. It is expected that, in many instances, legacy equipment installed at the customer premise may not support G.8032 signalling and packet forwarding techniques. FIG. 5 illustrates an alternative embodiment which avoids this limitation.

In the embodiment of FIG. 5, a conventional Link Aggregation Groups (LAG) is used to connect CLE 10 to a pair of nodes 4a and 4f via respective links 22a-b, in a manner closely similar to that described above with reference to FIG. 2b. A conventional aggregation function 24 coordinates traffic forwarding through the links 22 using a known LACP. However, in the embodiment of FIG. 5, the LAG is being used for link protection rather than load balancing. As a result, the conventional distributed aggregation functions 26 (FIG. 2b) at the network end of the access connection 12 are not needed. Instead, each node 4a and 4f uses an extension of G.8032 to enable control messaging defining Master/Slave relationships of the two end-nodes 4a and 4f and Active/Inactive states of each link 22 of the access connection 12.

For example, any suitable method may be used to select one of the nodes 4 as the Master, with the other node thus becoming the Slave. This selection may, for example, be based on any desired criteria including: random selection, respective identifiers of each node, a respective utilisation or a respective available capacity of each node. Other criteria may also be used, as desired. In the example of FIG. 5, node 4a is designated as the Master. Once selected, the Master node places its link 22a of the access connection 12 into an Active state, and sends one or more control messages to the other end-node (in this case, node 4f), designating it as the Slave and placing it (and its link 22b) into an Inactive state. In response to the Inactive state indication, node 4f places a logical block 38 on its link 22b of the access connection 12, which prevents node 4f from transmitting or receiving packets through that link 22b. The logical block 38 may, for example, be implemented as a policy applied to the port (not shown) hosting the Inactive link 22b, which discards packets having either a destination address or a source address corresponding with the CLE 10. Note that in the present application, an Inactive state of a node relates only to the transport of subscriber traffic to and from the CLE 10 via the applicable link 22 of the access connection 12. It does not in any way relate to the functional state of the node as a whole, or its behaviours with respect to other traffic flows within the Ethernet ring 2.

From the point of view of the client-side aggregation function 24, imposition of the logical bock 38 has the effect of preventing any packets from being received through the Inactive link 22b. Consequently, the client-side aggregation function 24 will "learn" the inactive state of the blocked link, and automatically forward traffic the to remaining (active) link 22a, which is the desired function. The Active node 4a can then properly forward packets between the active link 22a and the Ethernet ring 2 using the techniques described in G.8032. Because of the logical block 38 imposed on the inactive link 22b, there is no need to route packet flows between the CLE 10 and the Ethernet ring 2 via the Slave (Inactive) node 4f, nor is there any need to aggregate such flows with packets being transmitted through the active link 20a. As a result, the need for a distributed aggregation function 26, and for tight synchronization of the forwarding databases in the two end-nodes 4a and 4f, is eliminated.

In some embodiments, each end-node 4a and 4f may implement a respective instance of LACP, so that each node can communicate with the client side aggregation function 24. This can be beneficial in ensuring that the conventional client side aggregation function 24 "sees" a complementary aggregation function at the opposite end of the access connection 12, or at least an emulation of such a function that is sufficient to ensure satisfactory operation of the client side aggregation function 24.

In the event of a fault affecting the Active link 22a, the Master node 4a switches to the Inactive state, and imposes a logical block on that link 22a of the access connection 12, and then sends a control message to the Slave node 4f. Upon receipt of the control message, the Slave node 4f switches to the Active state, and removes the logical block 38 on its link 22b to the CLE 10. Consequently, the client side aggregation function 24 will learn the changed status of both links 22 of the access connection 12, and automatically redirect packet flows from the failed link 22a to the Active link 22b. End-to-End connectivity via the (new) Active link 22b and the Slave node 4f can then be re-established using known techniques.

In comparison with SMLT, the present invention has an advantage in that the amount of control signalling required to coordinate the Master/Slave relationships of the two end-nodes 4a and 4f and Active/Inactive states of each link 22 of the access connection 12, is significantly lower than that required to implement the distributed aggregation function 26 and the requisite coordination of the peer Nis 20a-b to emulate a single aggregator/NI system. Thus the present invention provides the desired connection resilience and high-speed failure recovery functionality as SMLT, but with very much lower control signalling overhead between the involved peer nodes.

In the embodiment of FIG. 5, the access connection 12 is composed of a Link Aggregation Group (LAG) comprising two links 22a-b connecting the CLE 10 to a respective pair of nodes 4a and 4f. It will be appreciated that this same functionality can readily be extended to LAGs comprising more than two links 22 to respective nodes, if desired. Network stability and loop freeness ins maintained by ensuring that only one link 22 of the access connection 12 is in an Active state at any given time, but there can be any desired number of Inactive links. Upon detection of a fault affecting the Active Link, one of the Inactive links is selected, and control signalling sent to the appropriate node to change the state of that link and remove its logical block. The remaining aspects of the control protocol described above remains largely unchanged.

In the above description, the present invention is described by way of examples that make specific reference to the access connection 12 between the CLE 10 and the Ethernet ring 2. It will be appreciated that exactly the same techniques can be applied to the hand-off connection 18 between an edge node such as gateway 14 (or a router) and the Ethernet ring 2

The embodiments of the invention described herein are intended to be illustrative only. References to specific devices or equipment sold by Ciena Corporation (or others) are therefore the be considered as examples only, and shall not be considered as limiting the scope of the invention, which is therefore intended to be limited solely by the scope of the appended claims.

I claim:

1. A method of enabling a resilient interface between a first node and a G.8032 Ethernet ring, the method comprising:
   providing a Link Aggregation Group (LAG) comprising respective links between the first node and at least two ring nodes of the Ethernet ring;
   providing an aggregation function at the first node, for distributing subscriber traffic to the links of the LAG in a conventional manner; and
   the at least two ring nodes performing steps of:
      designating a first one of the links as Active, and designating each of the other ones of the links as Inactive; and
      imposing a logical block on each designated inactive link, such that subscriber traffic between the first node and the Ethernet ring is routed by the aggregation function only through the active link.

2. The method as claimed in claim 1, wherein the first node comprises either one of Customer Located Equipment and an edge node of the network.

3. The method as claimed in claim 1, wherein designating a first one of the links as Active comprises:
   selecting, from among the at least two ring nodes, a master node; and
   asserting an Active state of the respective link between the first node and the selected master node.

4. The method as claimed in claim 3, wherein designating each of the other ones of the links as Inactive comprises sending, by the master node, a control message to each of the other ones of the ring nodes, the control message comprising at least an Inactive status indication.

5. The method as claimed in claim 3, further comprising:
   detecting a fault condition affecting traffic forwarding through the Active link;
   switching a status of the Active link to an Inactive state, and placing a logical block on that link; and
   switching a status of an other one of the at least two links to an Active state, and removing the logical block, such that subscriber traffic between the first node and the Ethernet ring is re-routed by the aggregation function through the new Active link.

6. The method as claimed in claim 5, wherein the Link Aggregation Group (LAG) comprises respective links between the first node and three or more ring nodes of the Ethernet ring, and wherein the step of switching a status of an other one of the at least two links comprises:
   selecting one of the ring nodes through which subscriber traffic is to be routed; and
   sending a control message to the selected ring node, the control message containing at least an Active state indication, the selected ring node being responsive to the control message to switch the status of its respective link of the LAG to an Active state and remove the logical block.

7. A network comprising:
   a G.8032 Ethernet ring having at least two ring nodes; and
   a Link Aggregation Group (LAG) comprising respective links between a first node and the at least two ring nodes of the Ethernet ring, the LAG including an aggregation function at the first node for distributing subscriber traffic to the links of the LAG in a conventional manner;
   wherein the at least two ring nodes are configured to:
      designate a first one of the links as Active, and designating other ones of the at links as Inactive; and
      impose a logical block on each inactive link of the LAG, such that subscriber traffic between the first node and the Ethernet ring is routed by the aggregation function only through the active link.

8. The network as claimed in claim 7, wherein the first node comprises either one of Customer Located Equipment and an edge node of the network.

9. The network as claimed in claim 7, wherein designating a first one of the links as Active comprises:
   selecting, from among the at least two ring nodes, a master node; and
   asserting an Active state of the respective link between the first node and the selected master node.

10. The network as claimed in claim 9, wherein designating each of the other ones of the links as Inactive comprises sending, by the master node, a control message to each of the other ones of the ring nodes, the control message comprising at least an Inactive status indication.

11. The network as claimed in claim 9, wherein the at least two ring nodes are further configured to perform the steps of:
   detect a fault condition affecting traffic forwarding through the Active link;
   switch a status of the Active link to an Inactive state, and placing a logical block on that link; and
   switch a status of an other one of the at least two links to an Active state, and removing the logical block, such that subscriber traffic between the first node and the Ethernet ring is re-routed by the aggregation function through the new Active link.

12. The network as claimed in claim 11, wherein the Link Aggregation Group (LAG) comprises respective links between the first node and three or more ring nodes of the Ethernet ring, and wherein the step of switching a status of an other one of the at least two links comprises:
   selecting one of the ring nodes through which subscriber traffic is to be routed; and
   sending a control message to the selected ring node, the control message containing at least an Active state indication, the selected ring node being responsive to the control message to switch the status of its respective link of the LAG to an Active state and remove the logical block.

* * * * *